(12) United States Patent
Messner et al.

(10) Patent No.: US 12,221,014 B2
(45) Date of Patent: Feb. 11, 2025

(54) CHILD RESTRAINT SYSTEM WITH BELT TENSIONING MECHANISM

(71) Applicant: Britax Child Safety, Inc., Fort Mill, SC (US)

(72) Inventors: Mark Messner, Lancaster, PA (US); Mitchell Shellenberger, Mount Joy, PA (US); Quentin G. Walsh, Fort Mill, SC (US); Brandon Hoover, Cornelius, NC (US)

(73) Assignee: Britax Child Safety, Inc., Fort Mill, SC (US)

( * ) Notice: Subject to any disclaimer, the term of this patent is extended or adjusted under 35 U.S.C. 154(b) by 0 days.

(21) Appl. No.: 18/376,976

(22) Filed: Oct. 5, 2023

(65) Prior Publication Data

US 2024/0025309 A1 Jan. 25, 2024

Related U.S. Application Data

(63) Continuation of application No. 17/494,520, filed on Oct. 5, 2021, now Pat. No. 11,807,139.

(60) Provisional application No. 63/088,051, filed on Oct. 6, 2020.

(51) Int. Cl.
*B60N 2/28* (2006.01)

(52) U.S. Cl.
CPC ......... *B60N 2/2806* (2013.01); *B60N 2/2816* (2023.08); *B60N 2/2821* (2013.01); *B60N 2/2845* (2013.01)

(58) Field of Classification Search
CPC .. B60N 2/2806; B60N 2/2821; B60N 2/2845; B60N 2002/2815
See application file for complete search history.

(56) References Cited

U.S. PATENT DOCUMENTS

| 7,988,230 B2 | 8/2011 | Heisey et al. |
| 8,322,788 B2 | 12/2012 | Williams et al. |
| 8,573,695 B2 | 11/2013 | Van Geer et al. |
| 8,973,991 B2 | 3/2015 | Wuerstl |

(Continued)

FOREIGN PATENT DOCUMENTS

| EP | 0930195 A2 | 7/1999 |
| EP | 1493616 A2 | 2/2009 |

OTHER PUBLICATIONS

Supplementary European Search Report; Sep. 26, 2024; EP Application No. 21878378.5.

*Primary Examiner* — Philip F Gabler
(74) *Attorney, Agent, or Firm* — K&L Gates LLP

(57) ABSTRACT

A child seat includes a tensioning mechanism that selectively applies tension to a seat belt to secure the child seat to a car seat. The child seat includes a base that defines a receiving region. The tensioning mechanism includes a bottom arm pivotably attached to the base within the receiving region and a top arm pivotably attached to the bottom arm. The tensioning mechanism is adjustable between a first configuration and a second configuration relative to the base. In both the first configuration and the second configuration, the tensioning mechanism defines a tortuous, nonlinear belt pathway. In the first configuration, the tensioning mechanism receives a portion of the seat belt, and in the second configuration, the tensioning mechanism applies tension to the portion of the seat belt.

6 Claims, 15 Drawing Sheets

(56) References Cited

U.S. PATENT DOCUMENTS

| | | | |
|---|---|---|---|
| 10,189,381 B2 | 1/2019 | Williams et al. | |
| 10,427,559 B2 | 10/2019 | Anderson et al. | |
| 10,723,245 B2 * | 7/2020 | Anderson | B60N 2/289 |
| 11,299,074 B2 | 4/2022 | Goare et al. | |
| 2009/0066131 A1 | 3/2009 | Hendry | |

* cited by examiner

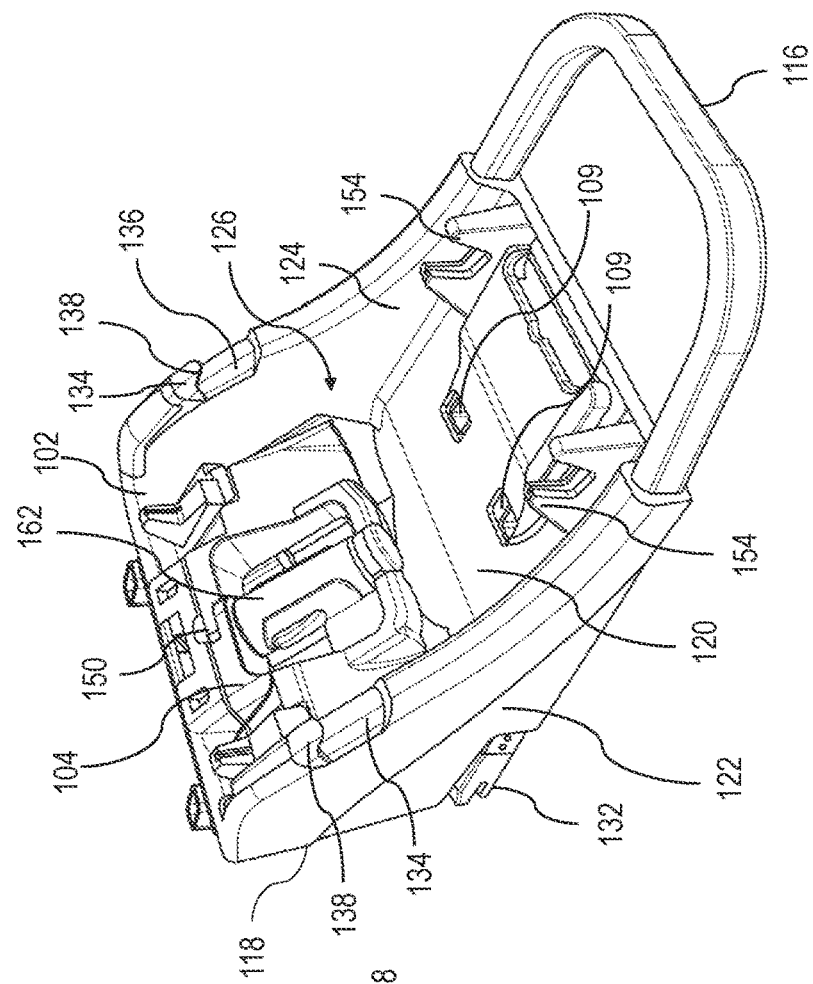
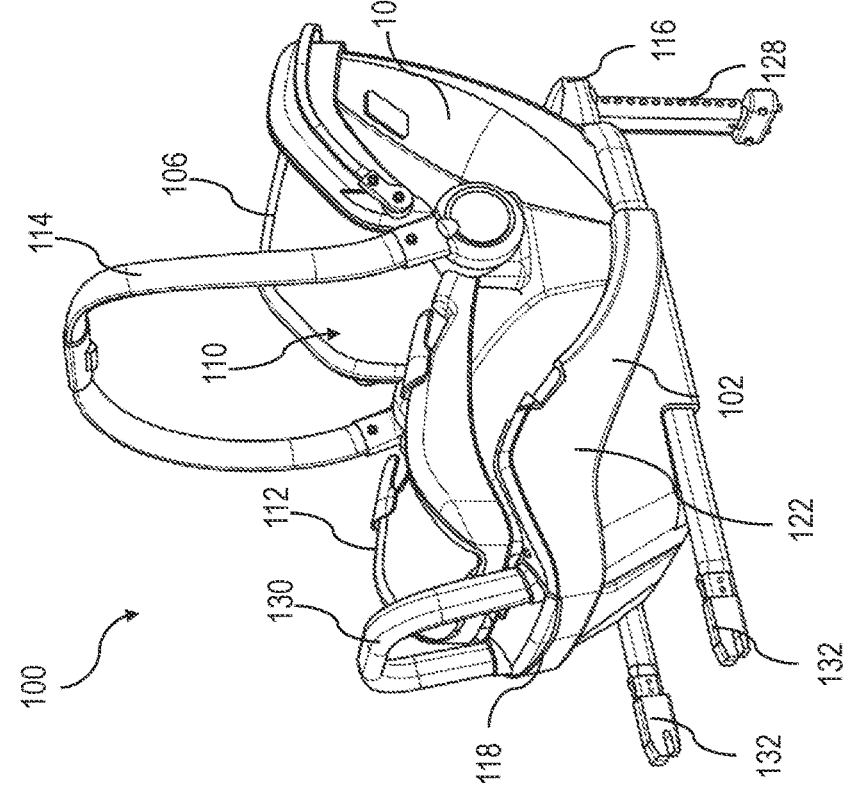
FIG. 2
FIG. 1

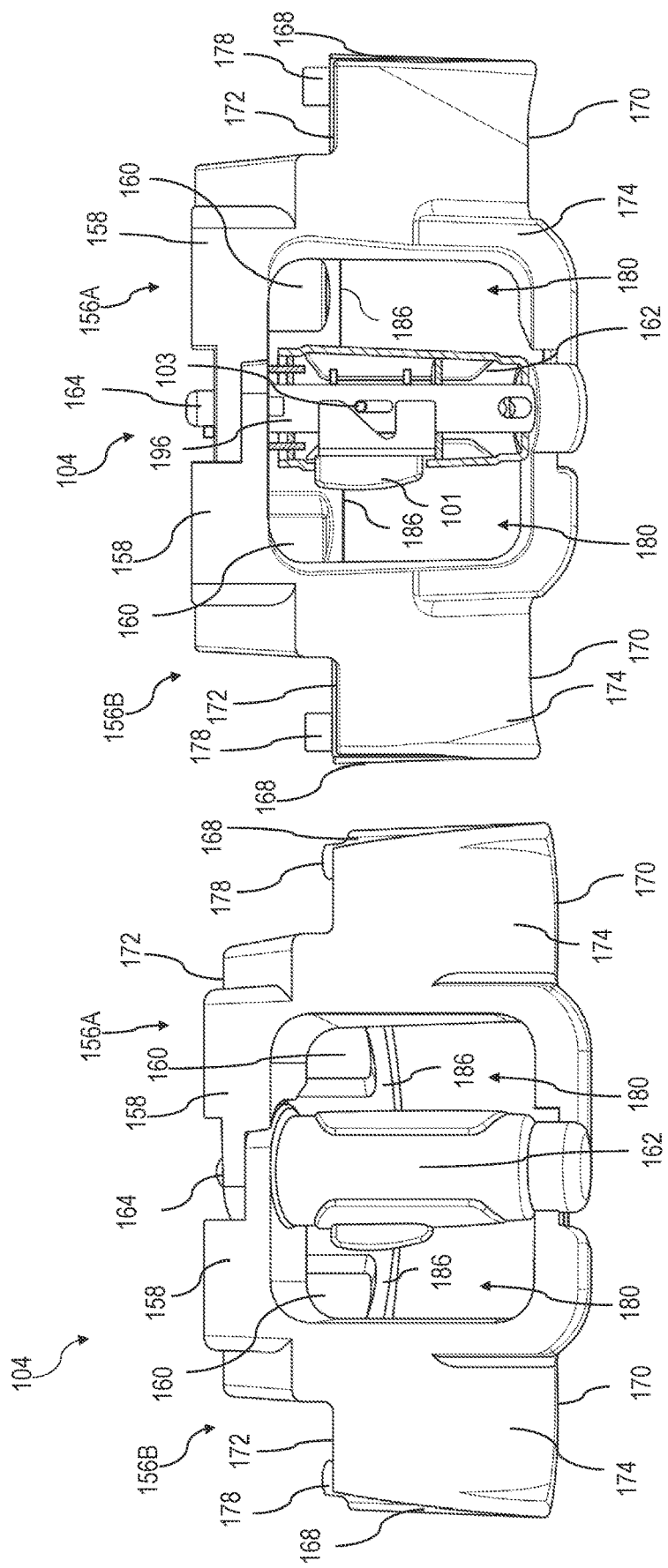

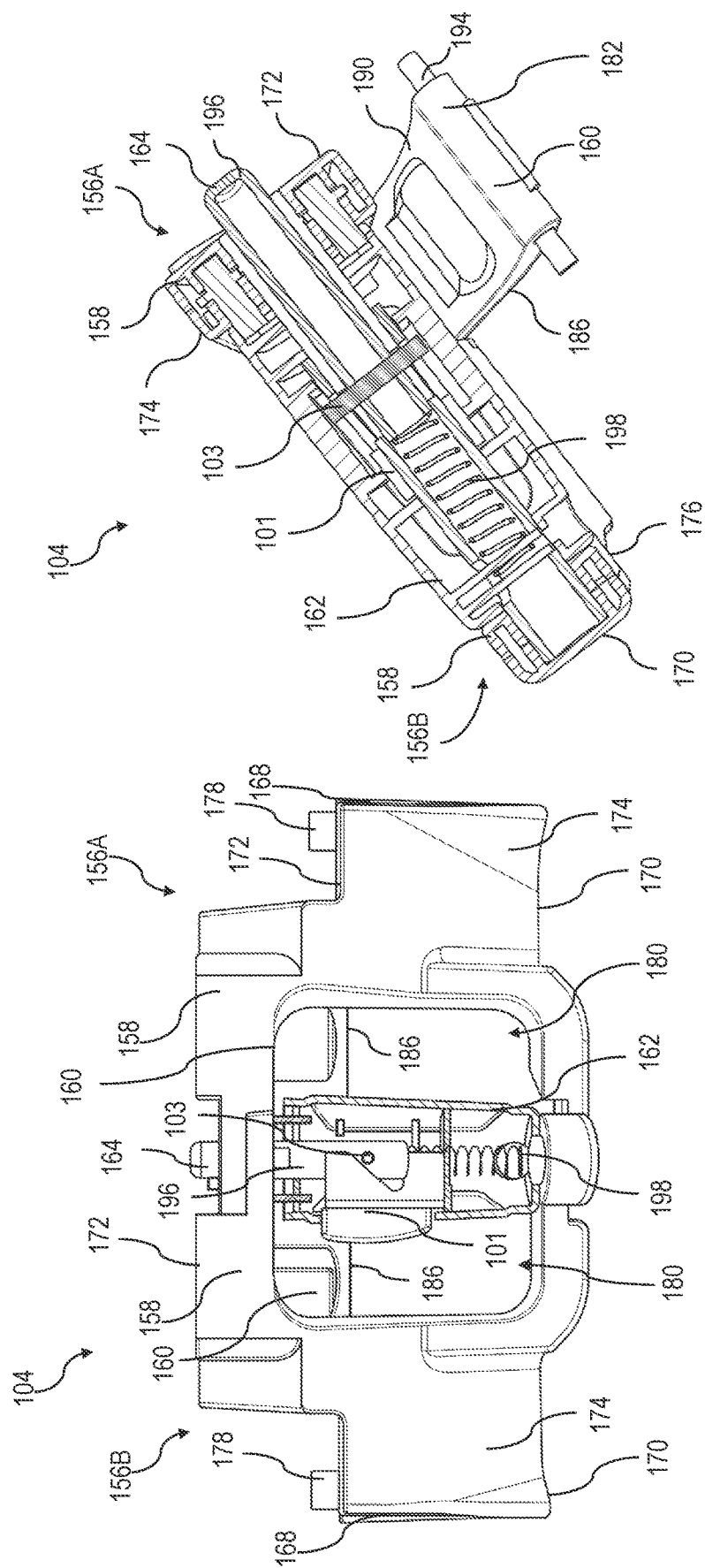

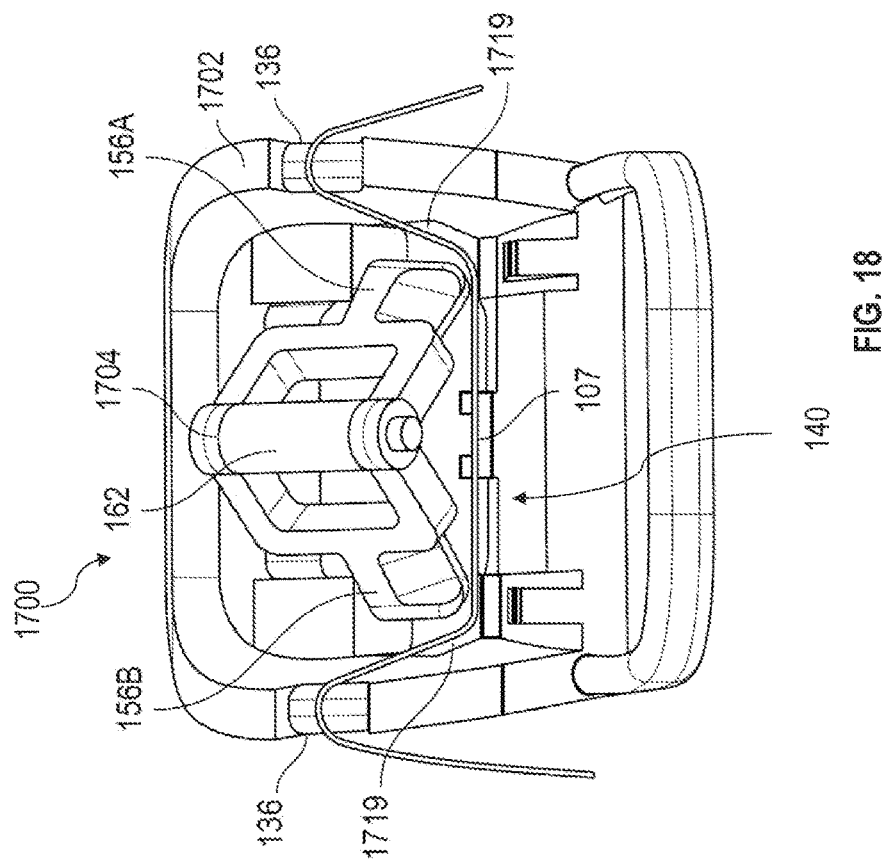
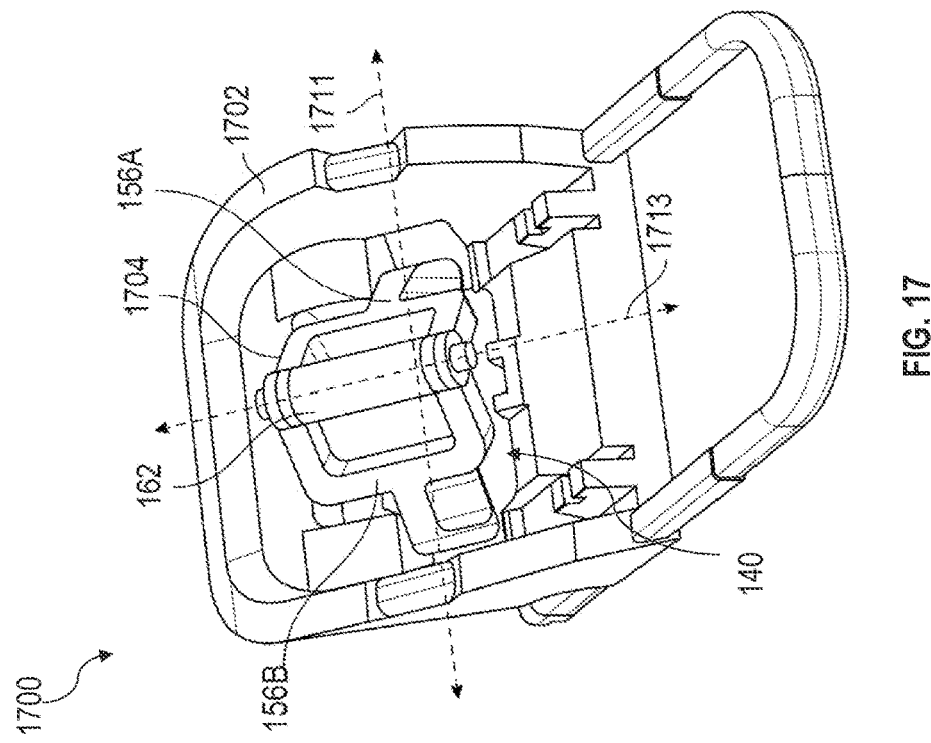

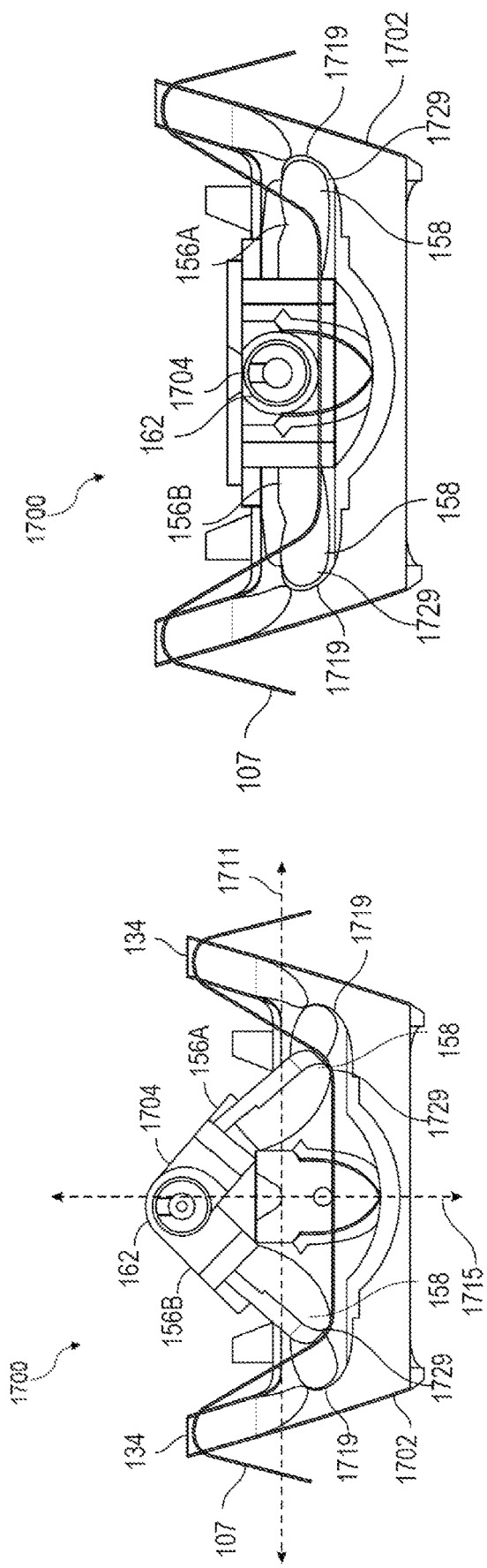

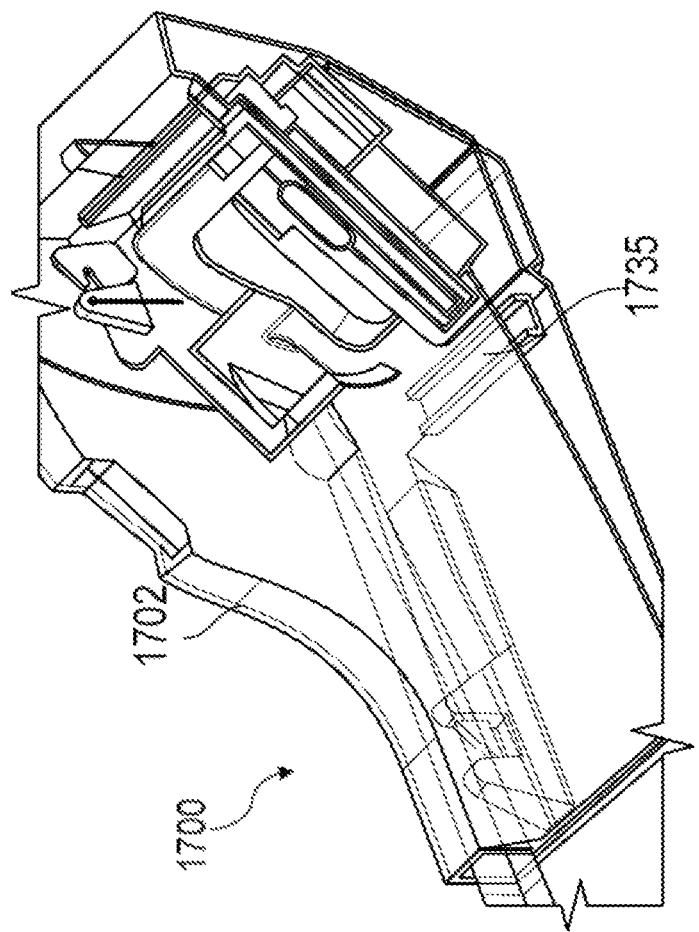

CHILD RESTRAINT SYSTEM WITH BELT TENSIONING MECHANISM

PRIORITY CLAIM AND CROSS-REFERENCE TO RELATED APPLICATIONS

The present application is a continuation of U.S. patent application Ser. No. 17/494,520, entitled CHILD RESTRAINT SYSTEM WITH BELT TENSIONING MECHANISM and filed Oct. 5, 2021, which claims priority to U.S. Provisional Patent Application No. 63/088,051, filed on Oct. 6, 2020, and entitled CAR SEAT ATTACHMENT SYSTEM, the contents of which are hereby incorporated by reference in their entirety.

FIELD OF THE INVENTION

This application relates to child restraint systems, and, more particularly, to child restraint systems with belt tensioning systems.

BACKGROUND

Child restraint systems, also commonly called child safety seats, child seats, car seats, or booster seats, among others, are designed to protect children in vehicles from the effects of impacts or sudden changes in motion (e.g., sudden acceleration, sudden deceleration, etc.). Child restraint systems, referred to hereinafter as child seats, may be used in a variety of vehicles with different seat types and/or seating configurations. It is important for a child seat to be properly secured to the vehicle (e.g., car) seat to protect the occupant, but it is not uncommon for such child seats to be installed or used improperly. For example, some child seats are secured to a car seat with a seat belt of the car, but in such situations, securing the child seat may be awkward and difficult, and a proper amount of tension may not be maintained. In such situations, an improper amount of tension is undesirable and may negatively affect the safety of the occupant secured within the child seat.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a child seat that may be secured to a car seat includes a base that includes a receiving region. The base may receive a belt of the car seat at least within the receiving region and to secure the child seat to the car seat. The child seat also includes a tensioning mechanism pivotably attached to the base within the receiving region. In certain embodiments, the tensioning mechanism includes first arm and a second arm, and the first arm is pivotably attached to the second arm. The tensioning mechanism may be adjustable between a first configuration and a second configuration. In some embodiments, in the first configuration, the first arm is at a first angle relative to the second arm and the tensioning mechanism is configured to receive a portion of the belt, and in the second configuration, the first arm is at a second angle relative to the second arm that is different from the first angle and the tensioning mechanism is configured to apply tension to the portion of the belt.

According to various embodiments, a child seat that may be secured to a car seat includes a base and a tensioning mechanism. The base includes a receiving region, and the base may receive a belt of the car seat at least within the receiving region and to secure the child seat to the car seat. In certain embodiments, the tensioning mechanism includes a bottom arm and a top arm. The bottom arm is pivotably attached to the base within the receiving region, and the top arm is pivotably attached to the bottom arm. The tensioning mechanism is adjustable between a first configuration and a second configuration. In some embodiments, in the first configuration, the top arm extends at a first angle relative to the bottom arm and the tensioning mechanism is configured to receive a portion of the belt, and in the second configuration, the top arm extends at a second angle relative to the bottom arm that is different from the first angle and the tensioning mechanism is configured to apply tension to the portion of the belt.

According to some embodiments, a child seat that may be secured to a car seat includes a base and a tensioning mechanism. The base includes a receiving region, and the base may receive a belt of the car seat at least within the receiving region and to secure the child seat to the car seat. The tensioning mechanism is attached to the base within the receiving region and is pivotable about a first pivot axis. In some embodiments, the tensioning mechanism includes a second pivot axis offset from and parallel to the first pivot axis, and the second pivot axis is movable relative to the base. The tensioning mechanism is adjustable between a first configuration and a second configuration. In certain embodiments, in the first configuration, the tensioning mechanism is configured to receive a portion of the belt, and wherein, in the second configuration, the tensioning mechanism is configured to apply tension to the portion of the belt.

According to certain embodiments, a child seat that may be secured to a car seat includes a base and a tensioning mechanism. The base may include a first side, a second side opposite the first side, and a receiving region between the first side and the second side. The base may receive a belt of the car seat from the first side to the second side and within the receiving region. The tensioning mechanism is pivotably attached to the base within the receiving region and is adjustable between a first configuration and a second configuration. In some embodiments, in the first configuration, the tensioning mechanism is configured to receive a portion of the belt, and in the second configuration, the tensioning mechanism is configured to apply tension to the portion of the belt. In various embodiments, in both the first configuration and the second configuration, the tensioning mechanism and the base define a tortuous, nonlinear belt pathway from the first side of the base to the second side of the base.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

FIG. 1 illustrates a child seat with a belt tensioning system according to various embodiments.

FIG. 2 illustrates a base of the child seat of FIG. 1 with the belt tensioning system.

FIG. 8 is another view of the belt tensioning system of FIG. 1.

FIG. 9 is another view of the belt tensioning system of FIG. 1 with a cover of a handle of the belt tensioning system removed.

FIG. 10 is another view of the belt tensioning system of FIG. 1 with the cover of the handle removed as well as a cover of a locking pin of the belt tensioning system removed.

FIG. 11 is a sectional view of the handle of the belt tensioning system of FIG. 1.

FIG. 17 is a perspective view of another base of a child seat with a belt tensioning system according to various embodiments.

FIG. 18 is another view of the base of FIG. 17.

FIG. 19 illustrates the base of FIG. 17 with the belt tensioning system in an unlocked configuration.

FIG. 20 illustrates the base of FIG. 17 with the belt tensioning system in a locked configuration.

FIG. 25 illustrates another portion of the base of FIG. 17.

DETAILED DESCRIPTION

Figure 4:
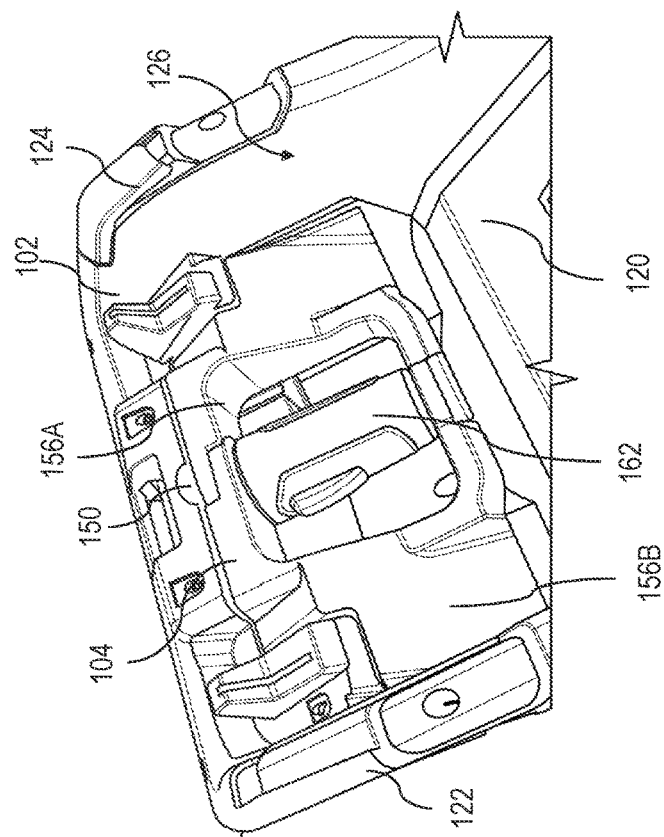
FIG. 4 is another view of the base and the belt tensioning system of FIG. 1.

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing. Throughout this disclosure, a reference numeral with a letter refers to a specific instance of an element and the reference numeral without an accompanying letter refers to the element generically or collectively. Thus, as an example (not shown in the drawings), device "12A" refers to an instance of a device class, which may be referred to collectively as devices "12" and any one of which may be referred to generically as a device "12". In the figures and the description, like numerals are intended to represent like elements.

A child seat may be configured for installation based on the height and weight of a child and according to various guidelines and standards, such as those of the United States National Highway Transportation Safety Administration. To ensure maximum protection for an occupant of the child seat, the child seat must be secured to a fixed location in a vehicle, such as using a seat belt of the car seat or LATCH (Lower Anchors and Tethers for Children) attachments. When seat belts are used to secure the child seats, the seat belts are often positioned around the child seat and then engaged with a buckle attached to the car seat. However, slack in the seat belt may often occur, even when the seat belt is tightly fastened, and such slack causes the child seat to be loosely secured to the vehicle, which presents an unsafe condition for the occupant.

In view of such limitations, described herein are tensioning mechanisms for child seats that provide easy securing of the child seat using a seat belt. In certain aspects, the tensioning mechanisms described herein may allow a user to easily apply tension to a buckled seat belt during installation of the child seat, and optionally may allow for a one-handed operation of the tensioning mechanism by the user. Such improved tensioning by the tensioning mechanism may secure the child seat to the car seat in a fully secured or tensioned configuration, which may provide increased safety for an occupant of the child seat. Various other advantages and benefits may be realized with the tensioning mechanisms described herein, and the aforementioned benefits and advantages should not be considered limiting.

FIGS. 1-16 illustrate an example of a child seat 100 according to various embodiments. As illustrated in FIGS. 1 and 2, for example, the child seat 100 includes a base 102 and a tensioning mechanism 104. In the embodiment illustrated, the child seat 100 is an infant car seat; however, in other embodiments, the tensioning mechanism 104 may be provided with other types of child seats as desired, including but not limited to convertible cart seats (i.e., can be forward-facing or rear-facing), a 3-in-1 car seat, a booster seat, and/or other types of child seats as desired. Likewise, while the tensioning mechanism 104 is illustrated with the base 102 of the child seat 100 in FIGS. 1-16, in other embodiments and depending on the type of child seat, the tensioning mechanism 104 may be provided at other locations as desired.

A carrier 106 may be releasably attached to the base 102. As illustrated in FIG. 1, the carrier 106 may include a shell 108 and generally defines an occupant area 110 for receiving an occupant, such as an infant, child, etc. The carrier 106 may include various feature such as padding and a dress cover 112 and a handle 114, among other features. However, the particular carrier 106 illustrated in FIG. 1 should not be considered limiting, and in various embodiments other types of carriers may be releasably attached to the base 102, including carriers that have additional and/or different features compared to those illustrated in FIG. 1.

Figure 3:
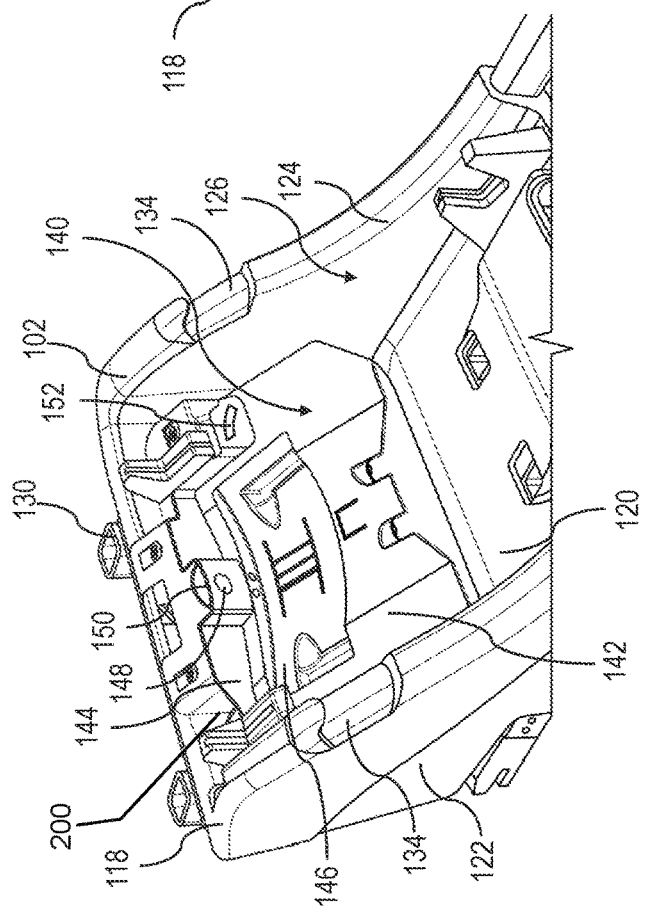
FIG. 3 is a view of the base of the child seat of FIG. 1 with the belt tensioning system removed.
Figure 5:
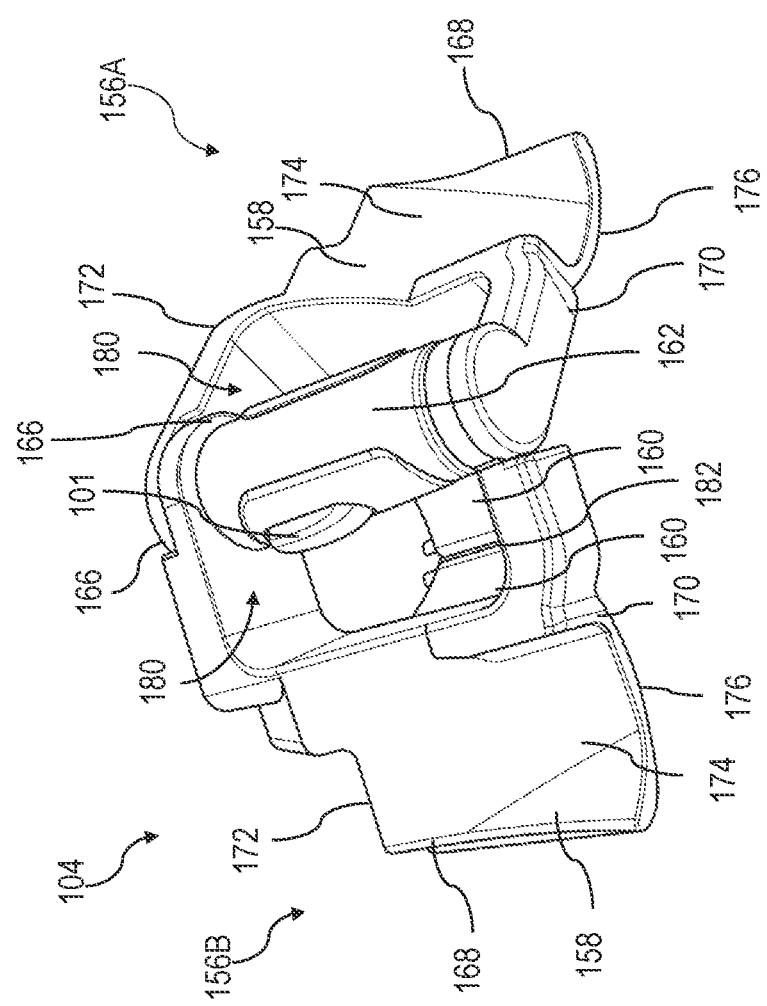
FIG. 5 illustrates the belt tensioning system of FIG. 1.

Referring to FIGS. 2-4, the base 102 of the child seat 100 includes a front end 116, a rear end 118 opposite from the front end 116, a base wall 120, a first sidewall 122 extending from the base wall 120, and a second sidewall 124 extending from the base wall 120. In various embodiments, the base wall 120, the first sidewall 122, and the second sidewall 124 together define a receiving area 126 of the base 102 that at least partially receives the carrier 106 and at least partially receives a seat belt of a car seat, as discussed in detail below.

As illustrated in FIG. 2, for example, the base 102 may include various carrier engagement features 154 within the receiving area 126 for selectively engaging the carrier 106. In the embodiment illustrated, the carrier engagement features 154 are hooks that selectively engage pins on the carrier 106, although other suitable types of carrier engagement features 154 may be utilized as desired.

As illustrated in FIGS. 2-4, for example, in certain embodiments the base 102 includes one or more belt guides 134 on the sidewalls 122, 124 for guiding and positioning a seat belt of the car seat relative to the base 102. In the embodiment illustrated, the belt guides 134 are provided on top edges of the sidewalls 122, 124, respectively, and define a guide region 136 that is recessed relative to the top edges of the sidewalls 122, 124. In certain embodiments, the guide regions 136 optionally extend at an oblique angle relative to a horizontal axis and a vertical axis of the base 102 such that the seat belt positioned within the guide regions 136 extends at an oblique angle relative to the horizontal axis and the vertical axis of the base 102. In other embodiments, the guide regions 136 need not extend at oblique angles relative to the horizontal axis and/or the vertical axis of the base 102. Optionally, and as best illustrated in FIGS. 2, 14A-B, and 15A-B, one or more belt guides 134 may include a guide cover 138 that extends at least partially over the guide regions 136. In such examples, and as discussed in detail below, when the seat belt is positioned within the guide regions 136, the guide covers 138 may at least partially overlap the seat belt to further facilitate positioning of the seat belt within the guide regions 136.

Figure 16:
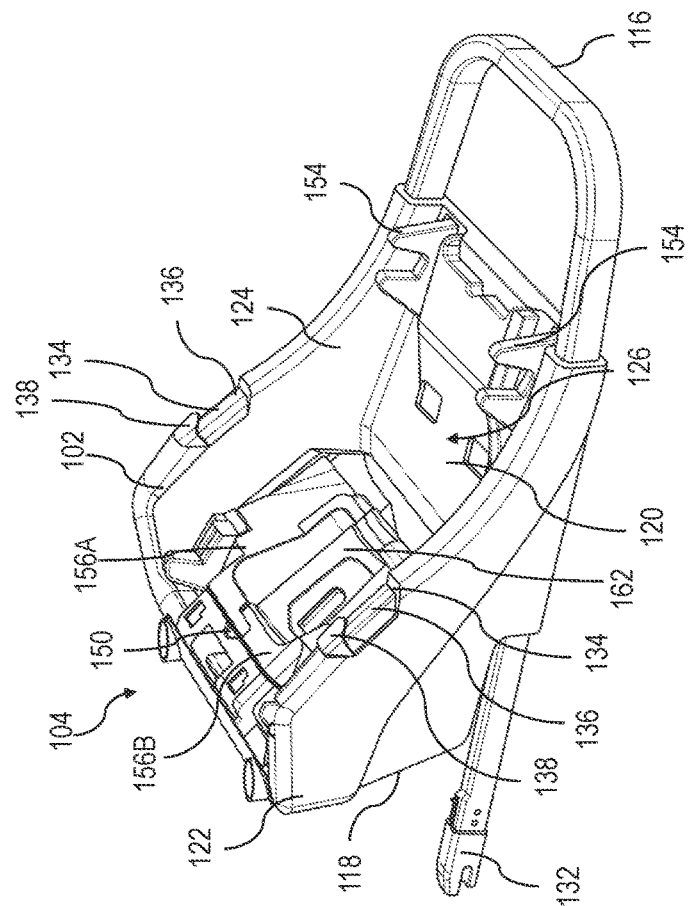
FIG. 16 illustrates the base of the child seat of FIG. 1 with a rigid connecter at least partially extended from the base.
Figure 15B:
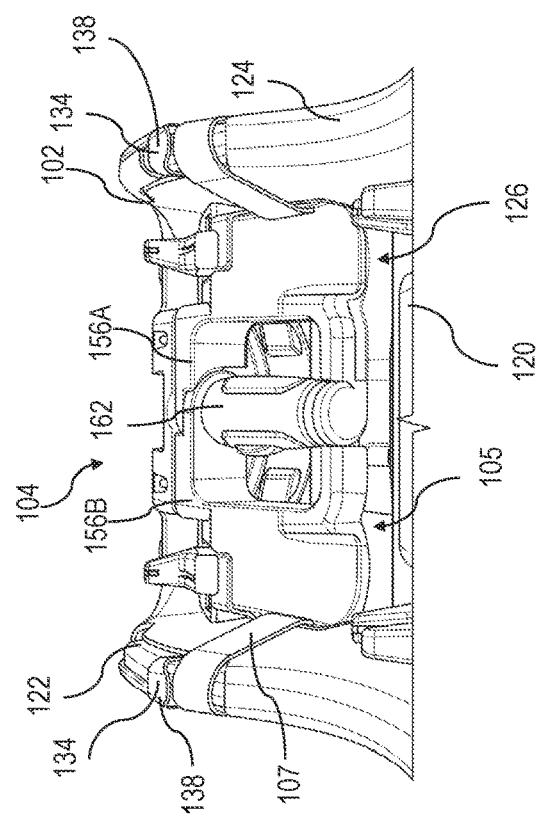

In certain embodiments, the base 102 optionally includes a load leg 128 extending from the front end 116. In some cases, the load leg 128 may be pivotably attached to the base 102, although it need not be in other examples. In various embodiments, the load leg 128 may be extendable, although in other embodiments the load leg 128 may have a fixed length. When included, the load leg 128 may selectively engage a floor of a vehicle directly in front of the car seat. Optionally, a rebound bar 130 may extend upwards from the top edge of the base 102 proximate to the rear end 118 or at any other location as desired. As best illustrated in FIGS. 1, 2, and 16, in some optional embodiments, the base 102 may include latches 132 for engaging anchors or latch bars on the car seat to secure the child seat 100 to a car seat, either in place of or in addition to the seat belt discussed below. Stated differently, in various embodiments, the child seat 100 may be secured to a car seat using only a seat belt, only the latches 132, or both the seat belt and the latches 132. In certain embodiments, the latches 132 optionally may be fixed to the base 102, and a latch locking mechanism 109 (see FIG. 9) may allow for selective extension and retraction of the latches 132 relative to the rear end 118 of the base 102. In the example illustrated, the latch locking mechanism 109 is a depressible button that, when depressed, allows for the latches 132 to slide to a desired extension or retraction relative to the base 102. In other embodiments, other types of latches 132 may be utilized as desired, and the latches 132 need not be rigid relative to the base 102. In further embodiments, the latches 132 may be omitted.

Referring to FIG. 3, the base 102 includes a cavity 140 within the receiving area 126 of the base 102. As discussed in detail below, the tensioning mechanism 104 may be at least partially positioned within the cavity 140 when the tensioning mechanism 104 is installed with the base 102. The cavity 140 includes a bottom cavity surface 142 and an end cavity surface 144. In various embodiments, the bottom cavity surface 142 defines a bottom channel 146 that at least partially receives a portion of the tensioning mechanism 104 as discussed in detail below. In certain embodiments, the tensioning mechanism 104 may be pivotably connected to the base 102 within the bottom channel 146, although it need not be within the bottom channel 146 in other embodiments. In various embodiments, the end cavity surface 144 optionally includes a locking cavity 148 that selectively receives a locking pin 164 of the tensioning mechanism 104. Optionally, a locking pin guide 150 may also be provided on the end cavity surface 144 that may facilitate positioning of the locking pin 164 between a locked position and an unlocked position as discussed in detail below. In various embodiments, the locking pin guide 150 may limit inadvertent movement of the tensioning mechanism 104 from a first configuration to a second configuration by providing resistance to such movement below certain force thresholds. In certain embodiments, the end cavity surface 144 includes one or more end channels 152 that may receive and guide guides 178 of the tensioning mechanism 104. In certain embodiments, the end channels 152 are arcuate shaped, although they need not be in other embodiments.

Referring to FIGS. 4-13, in certain embodiments, the tensioning mechanism 104 includes at least one arm assembly 156 having a top arm 158 and a bottom arm 160. In the embodiment illustrated, the tensioning mechanism 104 includes two arm assemblies 156A-B, each of which includes a top arm 158 and a bottom arm 160. In various embodiments, the tensioning mechanism 104 includes a handle 162 and a locking mechanism 196 supported by the at least one arm assembly 156.

As best illustrated in FIGS. 5-10, each top arm 158 includes a first end 166, a second end 168 opposite the first end 166, a front end 170, a back end 172 opposite the front end 170, a top side 174, and a bottom side 176 opposite the top side 174. In certain embodiments, the first end 166 may include a recessed portion 180 that may at least partially receive the handle 162 such that the front end 170 and the back end 172 at least partially overlap the handle 162. In various embodiments, a guide 178 may extend outwards from the back end 172 of the top arm 158. When the child seat 100 is assembled, the guide 178 may be positioned within a corresponding end channel 152 and may be moveable within the end channel 152. In some embodiments, the first end 166 may include various features or mechanisms enabling the top arms 158 to be pivotably or rotatably attached to each other and/or to the handle 162. In the embodiment illustrated, the first end 166 includes apertures for receiving pins that connect the top arms 158 and the handle 162 and enable rotation of the top arms 158 relative to each other. In certain aspects, the guide 178 within the corresponding end channel 152 may facilitate positioning of the tensioning mechanism between a first configuration and a second configuration as discussed in detail below. In various embodiments, at least a portion of the bottom side 176 optionally may have a non-linear curvature and/or be arcuate-shaped, which may facilitate positioning of the seat belt. In other embodiments, the bottom side 176 may have other profiles or shapes as desired.

In the embodiment illustrated, the top arm 158 of the arm assembly 156B is a mirrored configuration of the top arm 158 of the arm assembly 156A other than their engagement with each other. In particular, in the embodiment illustrated, the top arm 158 of the arm assembly 156A overlaps a portion of the top arm 158 of the arm assembly 156B; however, in other embodiments, such engagement may be reversed and/or the top arms 158 may be connected to each other in other configurations as desired.

Figure 7:
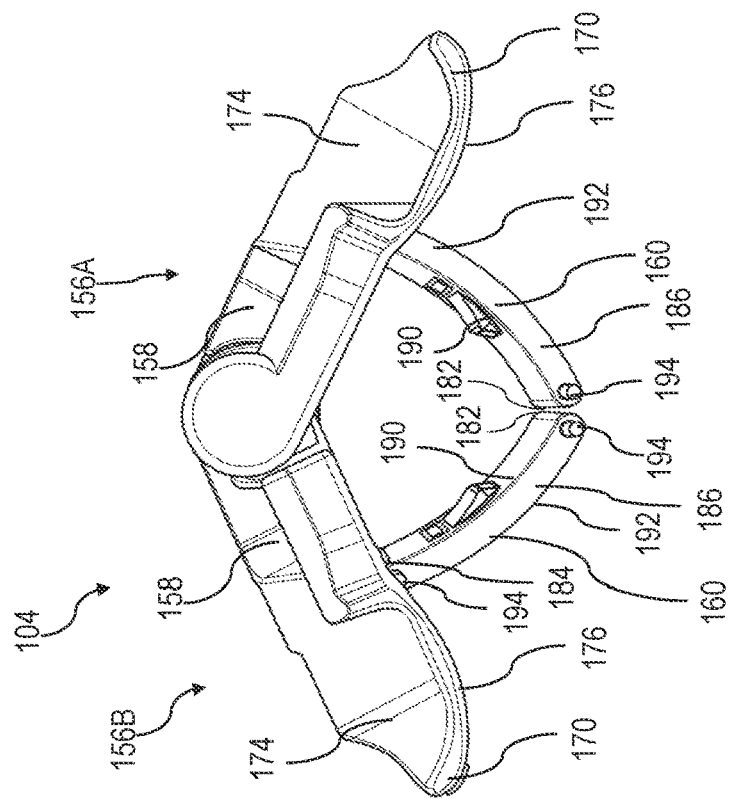
FIG. 7 is another view of the belt tensioning system of FIG. 1.
Figure 6:
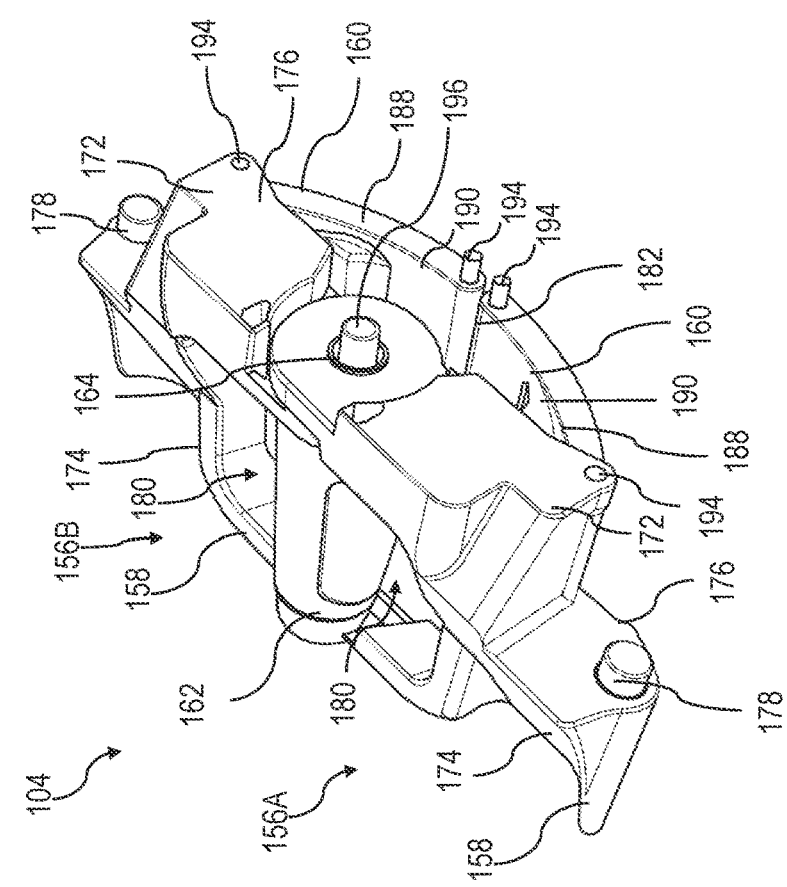
FIG. 6 is another view of the belt tensioning system of FIG. 1.

With reference to FIGS. 6-7, each bottom arm 160 includes a first end 182, a second end 184 opposite the first end 182, a front end 186, a back end 188 opposite the front end 186, a top side 190, and a bottom side 192 opposite the top side 190. In some embodiments, and as illustrated in FIG. 7, for example, the bottom side 192 may have a non-linear curvature and/or be arcuate shaped; however, in other embodiments, the bottom side 192 may have other profiles as desired. In various embodiments, a length of the bottom arm 160, or a distance from the first end 182 to the second end 184, optionally is less than a length of the top arm 158, which is a distance from the first end 166 to the second end 168. The first end 182 of the bottom arm 160 is connectable to the base 102, and the second end 184 of the bottom arm 160 is connectable to the corresponding top arm 158. In certain embodiments, the first end 182 and the second end 184 include various suitable features or mechanisms such that the bottom arm 160 is pivotably attached to both the base 102 and the top arm 158. In the embodiment of FIGS. 1-16, and as best illustrated in FIGS. 6 and 7, the first end 182 and the second end 184 each include apertures that receive pivot pins 194 that pivotably attach the bottom arm 160 with the base 102 and the top arm 158, respectively. In certain embodiments, the pivot pin 194 at the first end 182 is a first pivot axis of the arm assembly 156, and the pivot pin 194 at the second end 184 is a second pivot axis of the arm assembly 156. The first pivot axis and the second pivot axis extend parallel to each other, and as discussed in detail below, a position of the second pivot axis relative to the first pivot axis may be adjusted based on the tensioning mechanism 104 being in the first configuration or the second configuration.

In the embodiment illustrated, the bottom arm 160 of the arm assembly 156B is a mirrored configuration of the bottom arm 160 of the arm assembly 156A. In the embodiment illustrated, the bottom arms 160 are illustrated as having separate pivot attachments/pivot pins 194 at the first ends 182. In some cases, separate pivot attachments may provide improved stability and strength to the tensioning mechanism 104. However, in other embodiments, a single pivot pin 194 may be used to pivotably attach both bottom arms 160 to the base 102.

As mentioned, the handle 162 may be supported by the first ends 166 of the top arms 158, and the handle 162 may be gripped or otherwise used by a user to adjust the tensioning mechanism 104 between the first configuration and the second configuration. In some embodiments, and as best illustrated in FIGS. 8-10, the locking mechanism 196 may be supported by the top arms 158 for selectively securing the tensioning mechanism 104 in the first configuration or the second configuration. In the embodiment illustrated, and as illustrated in FIG. 9, the locking mechanism 196 includes a locking pin 164, a biasing member 198, and a button 101. The locking pin 164 is movable between a locked configuration, in which the locking pin 164 extends outwards from the back ends 168 of the top arms 158, and an unlocked configuration, in which the locking pin 164 is retracted within the handle 162 relative to the locked configuration. FIGS. 8-10 illustrated the locking pin 164 in the locked configuration. The biasing member 198 biases the locking pin 164 towards the locked configuration and may be various suitable devices or mechanisms as desired. In the embodiment illustrated, the biasing member 198 is a spring. The button 101 of the locking mechanism 196 may selectively move the locking pin 164 from the locked configuration to the unlocked configuration. In the embodiment illustrated, the button 101 is a depressible button that, when pressed by a user, engages a sliding pin 103 on the locking pin 164, thereby causing the locking pin 164 to move from the locked configuration to the unlocked configuration. Other mechanisms may be used as the locking mechanism 196 in other embodiments.

When the tensioning mechanism 104 is assembled, each bottom arm 160 is pivotably attached to the base 102 and a corresponding top arm 158, and the top arms 158 are pivotably attached to each other. In certain embodiments, the bottom arms 160 are pivotably attached to the base 102 within the bottom channel 146, although in other embodiments they may be pivotably attached to the base 102 at other locations within the receiving area 126 as desired. In various embodiments, each bottom arm 160 is pivotably attached to the corresponding top arm 158 on the bottom side 176 of the top arm 158. In certain cases, each bottom arm 160 may be pivotably attached to the top arm 158 at a location that is between the first end 166 and the second end 168 of the top arm 158. In some embodiments, each bottom arm 160 may be pivotably attached to the top arm 158 at a location that is offset from the front end 170 of the top arm 158. Such attachment of the bottom arm 160 to the top arm 158 may allow for the tensioning mechanism 104 to define a belt pathway while minimizing potential interference with the pivoting of the tensioning mechanism 104 about the first pivot axes and the second pivot axes.

Figure 13A:
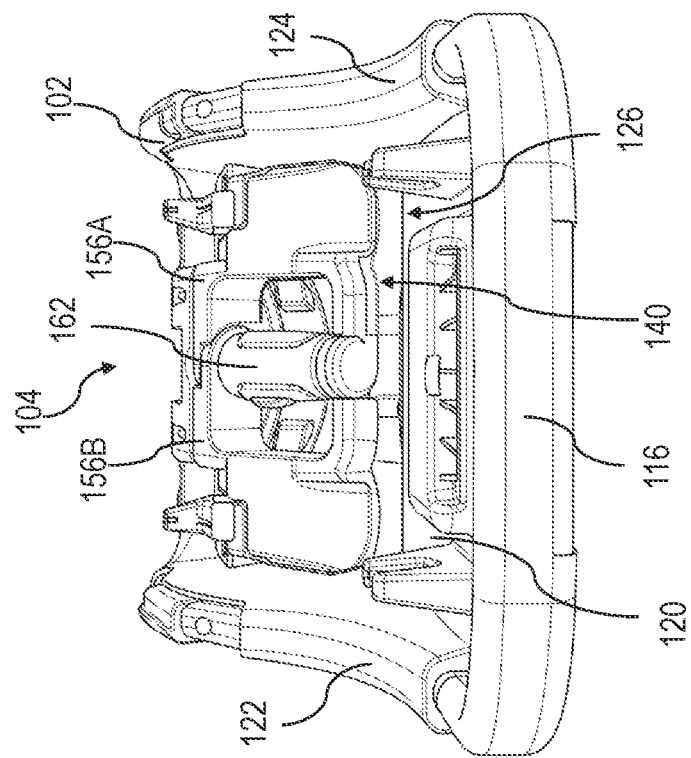
FIGS. 13A-B illustrate the base and the belt tensioning system of FIG. 1 with the belt tensioning system a locked configuration and in an unlocked configuration.
Figure 13B:
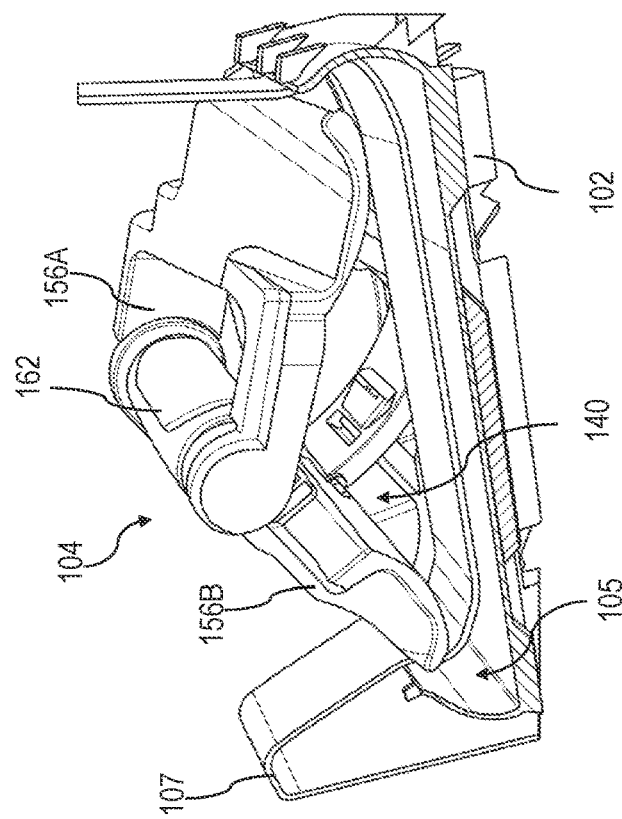
Figure 14A:
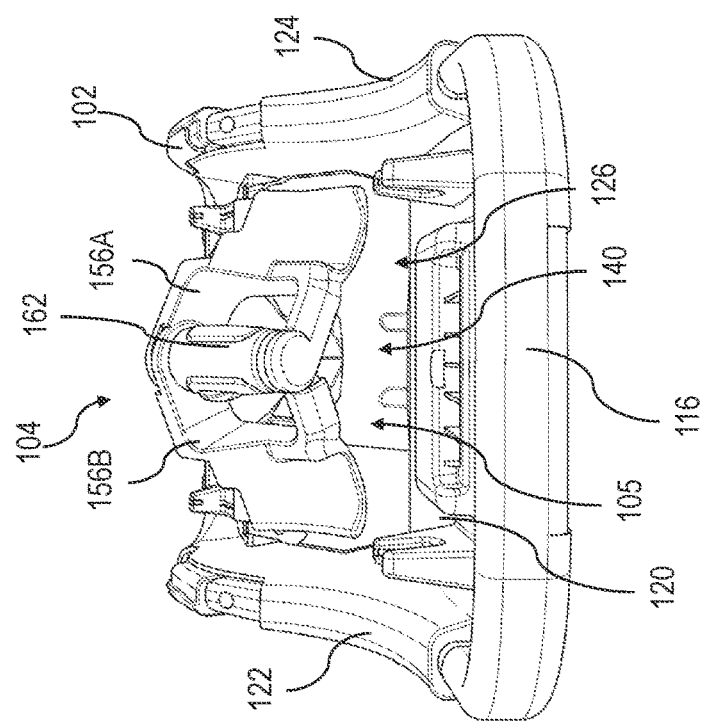
FIGS. 14A-B illustrate a seat belt positioned with the base and the belt tensioning system of FIG. 1 during an installation step and with the belt tensioning system in the unlocked configuration.
Figure 15A:
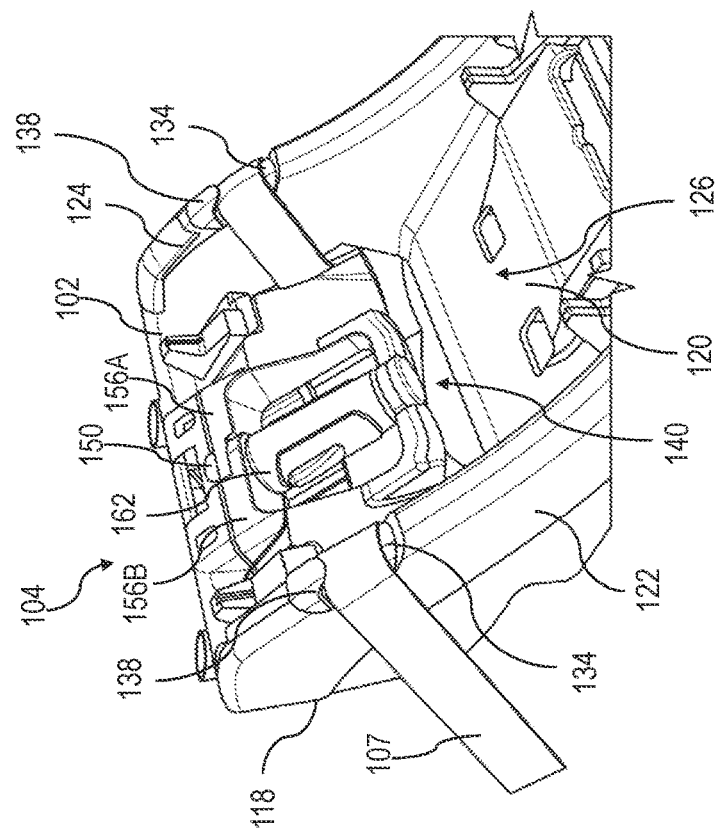
FIGS. 15A-B illustrate the belt tensioning system of FIG. 1 in the locked configuration during an installation step such that the seat belt is tensioned.
Figure 14B:
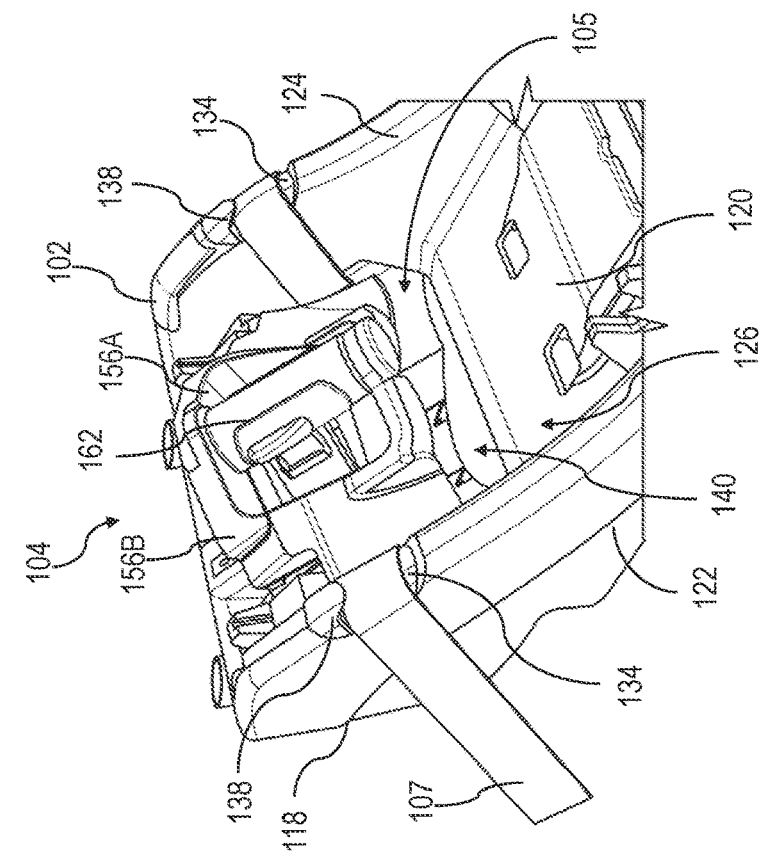

Referring to FIGS. 13A-B, the assembled tensioning mechanism 104 is adjustable between a first (or unlocked) configuration (FIG. 13B) and a second (or locked) configuration (FIG. 13A).

In various embodiments, the top arm 158 of each arm assembly 156 is pivotably attached to the corresponding bottom arm 160 such that in the first configuration, the top arm 158 extends at a first angle relative to the bottom arm 160, and in the second configuration, the top arm 158 extends at a second angle relative to the bottom arm 160 that is less than the first angle. In certain embodiments, in the first configuration, a plane of the top arm 158 of the arm assembly 156A extends at a non-straight angle relative to a plane of the top arm 158 of the arm assembly 156B. In some cases, the angle between the planes of the top arms 158 is an oblique angle in the first configuration, although it need not be in other embodiments. Similarly, in the first configuration, a plane of the bottom arm 160 of the arm assembly 156A extends at a non-straight angle relative to a plane of the bottom arm 160 of the arm assembly 156B. In various embodiments, the angle between the bottom arms 160 in the first configuration may be an oblique angle, although it need not be in other embodiments. In the second configuration, the top arms 158 may optionally extends substantially parallel to each other, or at least the angle between the top arms 158 is closer to a straight angle compared to the first configuration. Similarly, in the second configuration, the angle between the bottom arms 160 is closer to a straight angle compared to the first configuration.

Figure 12:
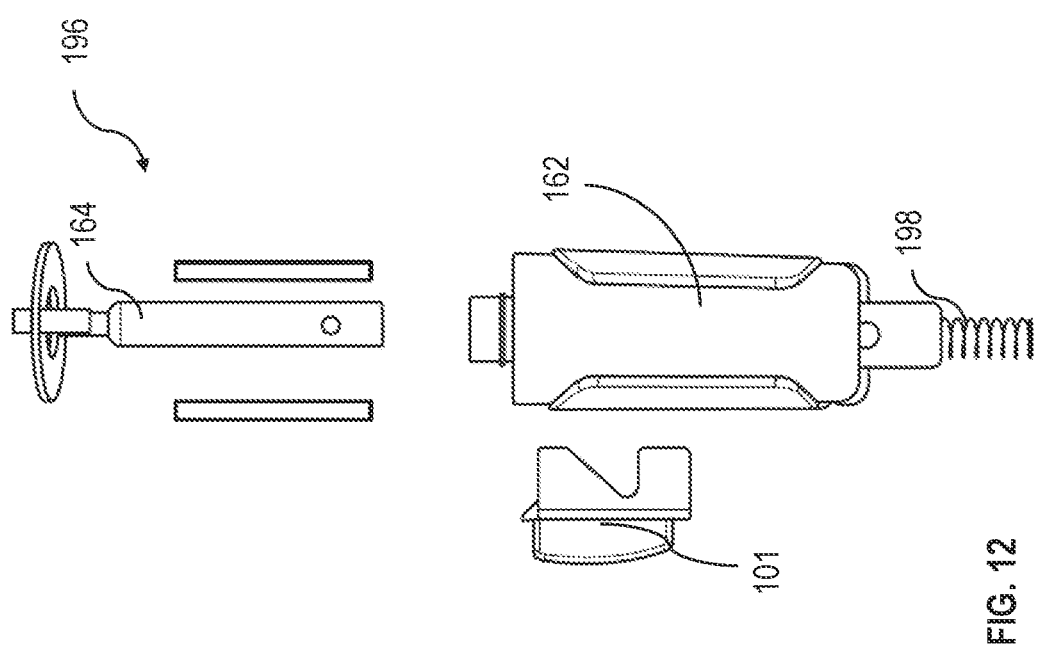
FIG. 12 is an exploded view of the handle of the belt tensioning system of FIG. 1.

In some embodiments, in the first configuration, the top sides 190 of the bottom arms 160 are spaced apart from the bottom sides 176 of the top arms 158, and in the second configuration, the top sides 190 of the bottom arms 160 optionally contact the bottom sides 176 of the top arms 158. In certain embodiments, and as illustrated in FIGS. 12 and 13, the first ends 166 of the top arms 158 may be spaced apart from the base 102 in the first configuration compared to the second configuration. In various embodiments, in the first configuration, the second pivot axis of each arm assembly 156 is offset outwards from the base 102 and relative to the first pivot axis compared to the configuration of the second pivot axis in the second configuration As illustrated in FIGS. 12 and 13, in the first configuration, a greatest distance between the tensioning mechanism 104 and the base 102 may be greater than a distance between the tensioning mechanism 104 and the base 102 in the second configuration.

The tensioning mechanism 104 is assembled with the base 102 by pivotably attaching the bottom arms 160 with the base 102. In certain embodiments, the bottom arms 160 optionally are pivotably attached to the base 102 within the bottom channel 146 of the cavity 140. The guides 178 extending from the top arms 158 may be positioned within the end channels 152 and the guides 178 within the end channels 152 may facilitate movement of the tensioning mechanism 104 between the first configuration and the second configuration. In various embodiments, the tensioning mechanism 104 is pivotably attached to the base 102 such that the first pivot axis and the second pivot axis extend at oblique angles relative to the horizontal axis and the vertical axis of the base 102. In some embodiments, the tensioning mechanism 104 is pivotably attached to the base 102 such that the top arms 158 and the bottom arms 160 are rotatable relative to each other and such that a relative angle between adjacent arms 158, 160 is adjustable. Stated differently, in some cases, the tensioning mechanism 104 is pivotably attached to the base 102 such that the tensioning mechanism is angled upwards in a front to back direction of the base 102. In some embodiments, the angled tensioning mechanism 104 and the angled pivot axes may provide an improved connection between the tensioning mechanism and a seat belt, and/or the angled tensioning mechanism 104 may facilitate movement of the tensioning mechanism 104 by a user between the first configuration and the second configuration. In other embodiments, the tensioning mechanism 104 need not be angled relative to the horizontal axis and/or the vertical axis.

While attached to the base 102, the tensioning mechanism 104 is adjustable between the first configuration and the second configuration. As illustrated in FIGS. 14A-B and 15A-B, in both the first configuration and the second configuration, the tensioning mechanism 104 and the base 102 together define a non-linear, tortuous belt pathway 105 for a seat belt 107. In various embodiments, the belt pathway 105 is defined over the sidewall 122 (or the sidewall 124), between the second end 168 of one of the top arms 158 and the cavity 140, between the bottom sides 176 of the top arms 158 and the bottom cavity surface 142, between the second end 168 of the other one of the top arms 158 and the cavity 140, and over the sidewall 124 (or the sidewall 122). In various embodiments, the belt pathway 105 defined between the bottom sides 176 of the top arms 158 and the bottom cavity surface 142 is defined adjacent to the bottom sides 176 between the front end 170 and the back end 172 of each top arm 158. In certain embodiments, the belt pathway 105 defined between the bottom sides 176 of the top arms 158 and the bottom cavity surface 142 is defined adjacent to the bottom sides 176 between the bottom arms 160 pivotably attached to the bottom side 176 and the front end 170 of each top arm 158.

In certain embodiments, in the first configuration (FIGS. 14A-B), an increased gap is defined between the tensioning mechanism 104 and the base 102 compared to the second configuration (FIGS. 15A-B) to facilitate placement and positioning of the seat belt 107 along the belt pathway 105. In various embodiments, the tensioning mechanism 104 in the first configuration may receive the seat belt 107, and the tensioning mechanism 104 in the second configuration applies tension to the seat belt 107 to secure the child seat 100 to a car seat associated with the seat belt 107 and provide increased safety for the occupant of the child seat 100. In some embodiments, the tortuosity of the belt pathway 105 in the second configuration is increased, and the second ends 168 of the top arms 158 may push the seat belt 107 outwards and into the sidewalls 122, 124 compared to the belt pathway 105 in the first configuration.

Referring to FIGS. 14A-B and 15A-B, a method of installing the child seat 100 with the tensioning mechanism is described below. A method of uninstalling the child seat 100 may be performed by reversing the order of steps described below.

In various embodiments, the method includes positioning the seat belt 107 along the belt pathway 105 while the tensioning mechanism 104 is in the first configuration. In some embodiments, positioning the seat belt 107 includes positioning a lap portion of the seat belt 107, a shoulder portion of the seat belt 107, or both the lap portion and the shoulder portion of the seat belt 107 along the belt pathway 105. In some embodiments, positioning the seat belt 107 along the belt pathway 105 includes positioning a portion of the seat belt 107 within the guide regions 136 of the belt guides 134 on the sidewalls 122, 124 of the base 102. In various embodiments, positioning the seat belt 107 may include positioning the seat belt 107 with any amount of initial tension as desired by the user.

The method includes moving the tensioning mechanism 104 from the first configuration to the second configuration such that the tensioning mechanism 104 applies tension to the seat belt 107 along the belt pathway 105. In some embodiments, moving the tensioning mechanism 104 from the first configuration to the second configuration includes pressing the button 101 on the handle 162 to at least partially retract the locking pin 164 towards the unlocked configuration of the locking pin 164 and applying a downwards force on the handle 162 (e.g., a force towards the base 102). However, in other embodiments, the button 101 need not be pressed and/or the locking pin 164 need not be retracted when the user applies the downwards force on the handle 162. In various embodiments, the downwards force applied on the handle 162 overcomes any resistance (or force threshold) that the locking pin guide 150 otherwise provides to the locking pin 164 against inadvertent movement towards the second configuration. The method includes applying the downward force such that the bottom arms 160 pivot relative to the base 102 and the top arms 158 pivot relative to each other and relative to the bottom arms 160. In certain embodiments, the method may include releasing the button 101 such that the locking pin 164 is biased towards the locked configuration, and applying the downward force until the locking pin 164 engages the locking cavity 148. The locking pin 164 engaged with the locking cavity 148 may lock the tensioning mechanism 104 in the second configuration.

Optionally, the method may include further securing the base 102 to the car seat by engaging the latches 132 on the base 102 with anchors or latch bars on the car seat. In certain embodiments, engaging the latches 132 with the anchors or latch bars includes adjusting a length of the latches 132 relative to the base 102 by engaging the latch locking mechanisms 109 on the base 102.

As mentioned, the child seat 100 with the tensioning mechanism 104 may provide improved tensioning to the seat belt 107 when installed to provide improved safety to the occupant of the child seat 100. In certain embodiments, the child seat 100 may allow for improved installation, optionally allowing for one-handed installation by the user to move the tensioning mechanism 104 from the first configuration to the second configuration.

FIGS. 17-25 illustrate another example of a child seat 1700 according to various embodiments. The child seat 1700 is substantially similar to the child seat 100 and includes a base 1702 and a tensioning mechanism 1704. The base 1702 is similar to the base 102 except that the base 1702 has a different shape and includes a different combination of features. The tensioning mechanism 1704 is substantially similar to the tensioning mechanism 104 except that the top arms 158 and bottom arms 160 have different shapes and profiles compared to those of the tensioning mechanism 104.

Figure 21:
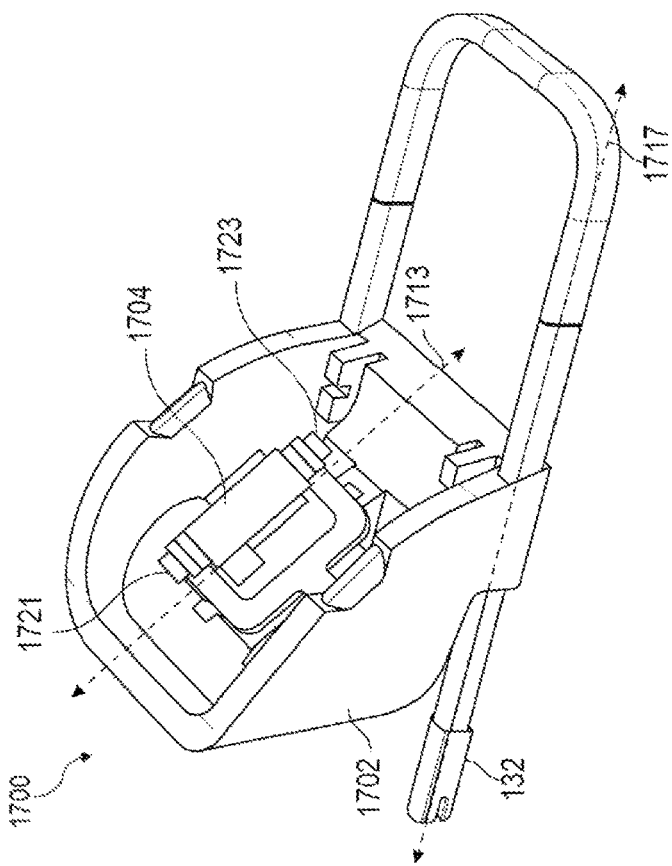
FIG. 21 illustrates the base of FIG. 17 with the belt tensioning system in the unlocked configuration and a rigid connector at least partially extended from the base.
Figure 24:
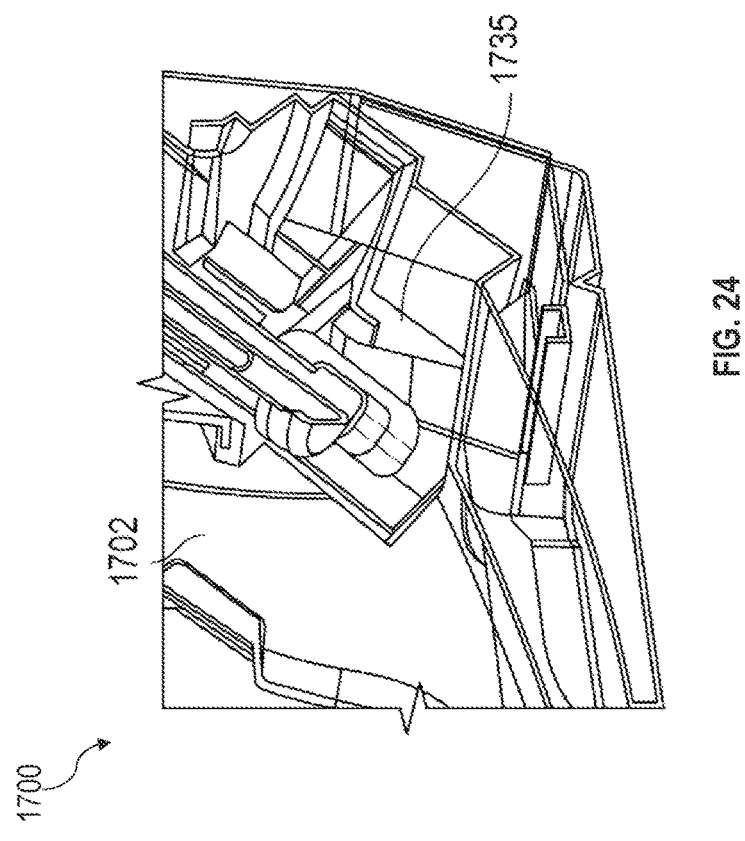
FIG. 24 illustrates another portion of the base of FIG. 17.
Figure 23:
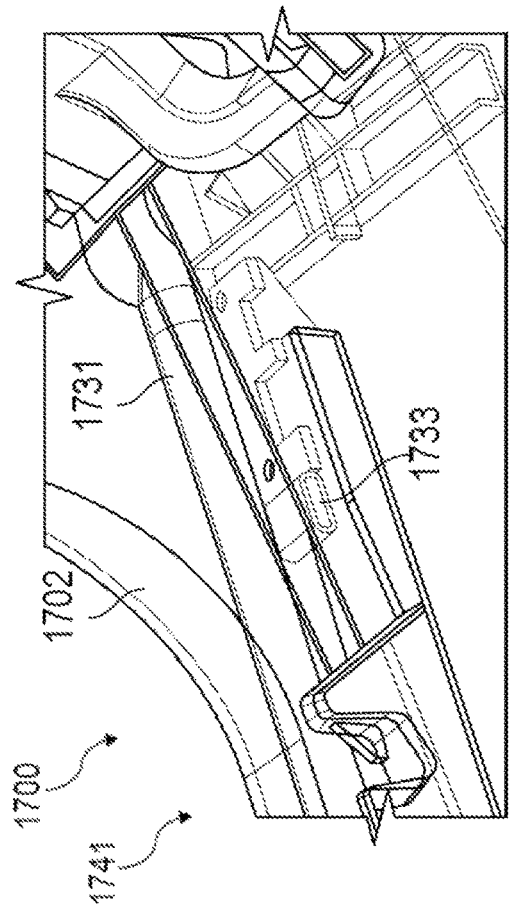
FIG. 23 illustrates a portion of the base of FIG. 17.

As illustrated in FIGS. 17, 19, and 21, in certain embodiments, the base 1702 includes a first axis 1711, a second axis 1713, a third axis 1715, and a fourth axis 1717. In certain embodiments, the first axis 1711 and/or the fourth axis 1717 are horizontal axes, and the third axis 1715 is a vertical axis. In certain embodiments, an axis of the handle 162 is parallel to, and optionally aligned with, the second axis 1713. The top arms of the arm assemblies 156A-B are rotatable along the axis of the handle 162 when the handle 162 is pushed or pulled parallel to the third axis 1715. In these embodiments, the angle formed by both the top members of the arm assemblies 156A-B is adjustable within a range defined by a minimal angle when the tensioning mechanism 1704 is in the first configuration and a maximal angle when the tensioning mechanism 1704 is in the second configuration. In some embodiments, the angle range between the minimal angle and the maximal angle is between approximately 90° and 180°, although in other embodiments the angle range may be outside of 90° to 180°, less than 90°, and/or greater than 180° as desired.

Compared to the tensioning mechanism 104, the tensioning mechanism 1704 does not include the adjustable locking pin 164 as the locking mechanism 196. Instead, and as illustrated in FIGS. 17, 18, 21, and 22, the locking mechanism 196 of the tensioning mechanism 1704 includes a first post 1721 and a second post 1723 extending outwards from the handle 162. In this embodiment, the cavity 140 includes a first channel 1725 and a second channel 1727 that receive and accommodate the posts 1721, 1723 when the tensioning mechanism 104 is in the second configuration.

As illustrated in FIGS. 18-20, the cavity 140 may include outer regions 1719 that may receive a portion of the seat belt 107 when the tensioning mechanism 1704 is in the second configuration. In certain aspects, the outer regions 1719 may allow for the tensioning mechanism 1704 to increase the tortuosity of the seat belt 107 in the second configuration. In certain embodiments, and as illustrated in FIGS. 19 and 20, the top arms 158 of the arm assemblies 156 may have an engagement portion 1729 (e.g., on the second ends 168) with a shape that is complimentary to a shape of the outer regions 1719 to facilitate positioning of the seat belt 107 within the outer regions 1719 and/or to increase tortuosity in the seat belt 107.

Similar to the child seat 100, to use the child seat 1700, a user places the base 1702 on a car seat, optionally centered or otherwise positioned between a paired seat belt 107 and a buckle. The handle 162 may be pulled as necessary to position the tensioning mechanism 1704 in the second configuration, and the seat belt 107 is threaded through one of the belt guides 134, under the engagement portion 1729 of one top arm 158, under the engagement portion 1729 of another top arm 158, and through a second one of the belt guides 134. The seat belt 107 may be buckled and pulled taut by the user. The user may grasp the handle 162 and press it parallel to the third axis 1715 of the base 1702. This action may drive each engagement portion 1729 into the corresponding outer region 1719 of the base 1702, which may further tighten the seat belt 107.

Optionally, one or more latches 132 may be used to further secure the child seat 1700 on the car seat, either in addition to the seat belt 107 or in place of the seat belt 107. Each latch 132 may include a hook or other suitable engagement feature. Optionally, a coupling assembly 1741 having a first member 1731 and a second member 1733 couples the latch 132 to the base 1702. In these embodiments, the first member 1731 may be on the latch 132 and the second member 1733 may be on the base 1702. A releasing component (not shown, but optionally similar to the latch locking mechanism 109) optionally may disengage the first member 1731 from the second member 1733 as desired. Optionally, a linkage system 1735 may transfer mechanical energy from the action of the handle 162 to the coupling assembly 1741. In such embodiments, a user may operate the releasing component to disengage the latch 132 from a bight of the car seat. The user may push the child seat 1700 into the seat bight, engaging the ratcheting system that may prevent the latch 132 from extending from the base 1702 unless the releasing component is operated. The user may then operate the handle 162, which in turn acts upon the coupling assembly 1741 to further retract the latch 132 within the base 1702 (see FIG. 22). In some embodiments, each stroke of the handle 162 from the first configuration to the second configuration causes the latch 132 to retract into the base 1701 by a single ratchet position or "click," further tightening and securing the child seat 1700 on the car seat.

Figure 22:
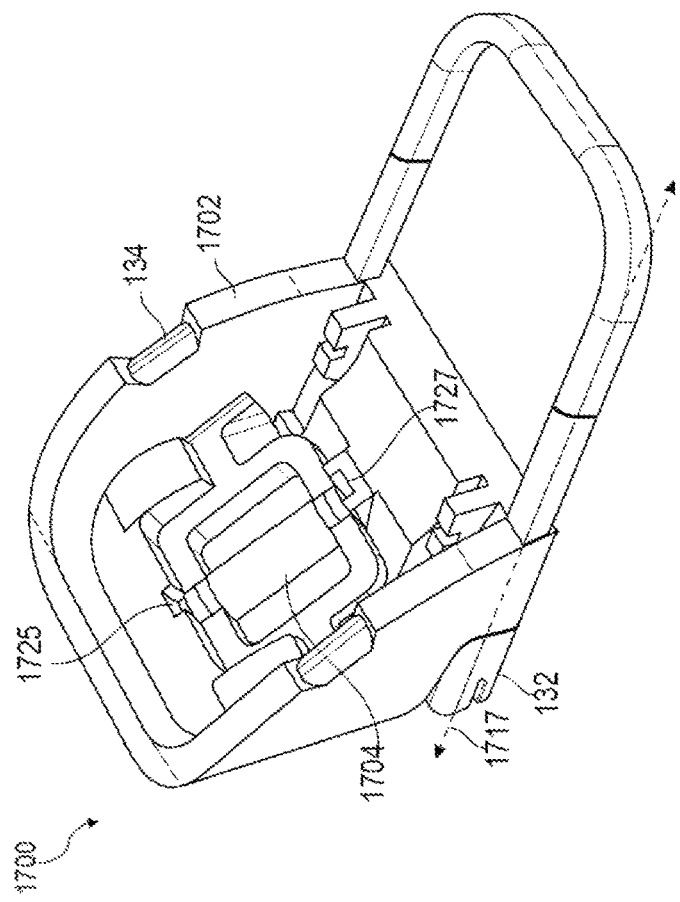
FIG. 22 illustrates the base of FIG. 17 with the belt tensioning system in the locked configuration and the rigid connector retracted relative to the base.

In certain embodiments, the latches 132 optionally are coupled to the tensioning mechanism 1704 such that movement of the tensioning mechanism 1704 between the first configuration and the second configuration in turn moves the latches between a first configuration and a second configuration. In some embodiments, and as illustrated in FIGS. 21 and 22, in the first (unlocked) configuration (FIG. 21), the latches 132 may be in a first configuration having a first extension length, and in the second (locked) configuration (FIG. 22), the latches 132 may be in a second configuration having a second extension length that is less than the first length. In such examples, the movement of the tensioning mechanism 1704 to the second configuration in turn pulls the child seat 1700 closer to and in tighter engagement with the car seat (assuming that the latches 132 have been engaged with the anchors of the car seat), which may provide increased safety to the occupant of the seat. The latches 132 in the first configuration (i.e., the extended configuration) may position the latches 132 to facilitate engagement of the latches 132 with the anchors of the car seat. The configurations of the latches 132 in FIGS. 21 and 22 are for illustrative purposes only, and in other embodiments, the latches 132 may be at different lengths when the tensioning mechanism 1704 is in the first configuration or the second configuration. As a non-limiting example, in some embodiments, the length of the latches 132 is greatest when the tensioning mechanism 1704 is in the second configuration. It is again noted that the latches 132 are optional, and embodiments that include the latches 132, the child seat 1700 may be secured to the car seat using just the seat belt 107, just the latches 132, or both the seat belt 107 and the latches 132. Moreover, as previously mentioned, the tensioning mechanism 1704 may be used with any type of child seat as desired, and the tensioning mechanism 1704 is not limited to infant car seats and/or the seat 1700 illustrated in FIGS. 17-25.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A child seat configured to be secured to a car seat, the child seat comprising: a base comprising a receiving region, wherein the base is configured to receive a belt of the car seat at least within the receiving region and to secure the child seat to the car seat; and a tensioning mechanism pivotably attached to the base within the receiving region, wherein the tensioning mechanism comprises first arm and a second arm, wherein the first arm is pivotably attached to the second arm, wherein the tensioning mechanism is adjustable between a first configuration and a second configuration, wherein, in the first configuration, the first arm is at a first angle relative to the second arm and the tensioning mechanism is configured to receive a portion of the belt, and wherein, in the second configuration, the first arm is at a second angle relative to the second arm that is different from the first angle and the tensioning mechanism is configured to apply tension to the portion of the belt.

Illustration 2. The child seat of any preceding or subsequent illustrations or combination of illustrations, wherein the first arm comprises a top arm and the second arm comprises a bottom arm, wherein the bottom arm is pivotably attached to the base and pivotably attached to the top arm, and wherein the second angle is less than the first angle.

Illustration 3. The child seat of any preceding or subsequent illustrations or combination of illustrations, wherein the first arm comprises a first top arm and the second arm comprises a first bottom arm, and wherein the tensioning mechanism further comprises: a second bottom arm pivotably attached to the base; and a second top arm pivotably attached to the second bottom arm and pivotably attached to the first top arm, wherein, in the first configuration, the first top arm extends at a non-straight angle relative to the second top arm, and in the second configuration, the first top arm extends parallel to the second top arm.

Illustration 4. The child seat of any preceding or subsequent illustrations or combination of illustrations, wherein the tensioning mechanism comprises a locking pin movable between a locked position and an unlocked position, wherein the base further comprises a cavity within the receiving region, wherein the cavity comprises a bottom cavity surface and an end cavity surface extending outwards from the bottom cavity surface, wherein the end cavity surface comprises a locking aperture configured to receive the locking pin of the tensioning mechanism in the second configuration such that the locking pin is in the locked position.

Illustration 5. The child seat of any preceding or subsequent illustrations or combination of illustrations, wherein the end cavity surface further comprises a guide channel, and wherein the tensioning mechanism further comprises a guide that is slidable within the guide channel.

Illustration 6. The child seat of any preceding or subsequent illustrations or combination of illustrations, wherein the tensioning mechanism further comprises a biasing member biasing the locking pin towards the locked position.

Illustration 7. A child seat configured to be secured to a car seat, the child seat comprising: a base comprising a receiving region, wherein the base is configured to receive a belt of the car seat at least within the receiving region and to secure the child seat to the car seat; and a tensioning mechanism comprising a bottom arm and a top arm, wherein the bottom arm is pivotably attached to the base within the receiving region, and wherein the top arm is pivotably attached to the bottom arm, wherein the tensioning mechanism is adjustable between a first configuration and a second configuration, wherein, in the first configuration, the top arm extends at a first angle relative to the bottom arm and the tensioning mechanism is configured to receive a portion of the belt, and wherein, in the second configuration, the top arm extends at a second angle relative to the bottom arm that is different from the first angle and the tensioning mechanism is configured to apply tension to the portion of the belt.

Illustration 8. The child seat of any preceding or subsequent illustrations or combination of illustrations, wherein the bottom arm comprises a first end and a second end opposite from the first end, wherein the top arm comprises a first end and a second end opposite from the first end, wherein the first end of the bottom arm is pivotably attached to the base, and wherein the second end of the bottom arm is pivotably attached to the top arm between the first end and the second end of the top arm.

Illustration 9. The child seat of any preceding or subsequent illustrations or combination of illustrations, wherein the top arm further comprises a top side and a bottom side, and wherein the second end of the bottom arm is pivotably attached to the bottom side of the top arm between the first end and the second end of the top arm.

Illustration 10. The child seat of any preceding or subsequent illustrations or combination of illustrations, wherein the top arm further comprises a front end, a back end opposite the front end, a top side, and a bottom side opposite the top side, and wherein a belt pathway is defined between the bottom side of the top arm and the base and between the bottom arm and the front end of the top arm.

Illustration 11. The child seat of any preceding or subsequent illustrations or combination of illustrations, wherein the top arm comprises a front end, a back end opposite the front end, and a guide extending outwards from the back end, and wherein the base the base further comprises a cavity within the receiving region, wherein the cavity comprises a bottom cavity surface and an end cavity surface extending outwards from the bottom cavity surface, wherein the end cavity surface comprises a guide channel, and wherein the guide is slidable within the guide channel.

Illustration 12. The child seat of any preceding or subsequent illustrations or combination of illustrations, wherein the top arm further comprises a front end and a back end opposite the front end, wherein the tensioning mechanism further comprises a handle pivotably supported by the top arm, and wherein the handle comprises a locking pin movable between a locked position and an unlocked position, wherein, in the locked position, the locking pin extends outwards from the front end of the top arm.

Illustration 13. The child seat of any preceding or subsequent illustrations or combination of illustrations, wherein the handle further comprises: a biasing member biasing the locking pin towards the locked position; and a button configured to selectively move the locking pin from the locked position to the unlocked position.

Illustration 14. The child seat of any preceding or subsequent illustrations or combination of illustrations, wherein the bottom arm is a first bottom arm and the top arm is a first top arm, and wherein the tensioning mechanism further comprises: a second bottom arm pivotably attached to the base within the receiving region; and a second top arm pivotably attached to the second bottom arm and pivotably attached to the first top arm.

Illustration 15. The child seat of any preceding or subsequent illustrations or combination of illustrations, wherein, in the first configuration, the first top arm extends at a first top arm angle relative to the second top arm, and wherein, in the second configuration, the first top arm extends at a second top arm angle relative to the second top arm, wherein the first top arm angle is less than the second top arm angle.

Illustration 16. A child seat configured to be secured to a car seat, the child seat comprising: a base comprising a receiving region, wherein the base is configured to receive a belt of the car seat at least within the receiving region and to secure the child seat to the car seat; and a tensioning mechanism attached to the base within the receiving region and pivotable about a first pivot axis, wherein the tensioning mechanism comprises a second pivot axis offset from and parallel to the first pivot axis, wherein the second pivot axis is movable relative to the base, wherein the tensioning mechanism is adjustable between a first configuration and a second configuration, wherein, in the first configuration, the tensioning mechanism is configured to receive a portion of the belt, and wherein, in the second configuration, the tensioning mechanism is configured to apply tension to the portion of the belt.

Illustration 17. The child seat of any preceding or subsequent illustrations or combination of illustrations, wherein the tensioning mechanism comprises a bottom arm and a top arm, wherein the bottom arm is pivotably attached to the base and pivotable about the first pivot axis, and wherein the top arm is pivotably attached to the bottom arm and defines the second pivot axis.

Illustration 18. The child seat of any preceding or subsequent illustrations or combination of illustrations, wherein the bottom arm is a first bottom arm and the top arm is a first top arm, and wherein the tensioning mechanism further comprises: a second bottom arm pivotably attached to the base within the receiving region; and a second top arm pivotably attached to the second bottom arm and pivotably attached to the first top arm.

Illustration 19. The child seat of any preceding or subsequent illustrations or combination of illustrations, wherein a greatest distance between the tensioning mechanism and the base in the first configuration is greater than a distance between the tensioning mechanism and the base in the second configuration.

Illustration 20. The child seat of any preceding or subsequent illustrations or combination of illustrations, wherein the tensioning mechanism comprises: a bottom arm attached to the base within the receiving region, the bottom arm pivotable relative to the base about the first pivot axis; a top arm attached to the bottom arm, the attachment of the top arm and the bottom arm defining the second pivot axis, and wherein the top arm is pivotable relative to the bottom arm about the second pivot axis; and a handle supported by the top arm, wherein the handle comprises a locking pin configured to engage the base in the second configuration.

Illustration 21. A child seat configured to be secured to a car seat, the child seat comprising: a base comprising a first side, a second side opposite the first side, and a receiving region between the first side and the second side, wherein the base is configured to receive a belt of the car seat from the first side to the second side and within the receiving region; and a tensioning mechanism pivotably attached to the base within the receiving region, wherein the tensioning mechanism is adjustable between a first configuration and a second configuration, wherein, in the first configuration, the tensioning mechanism is configured to receive a portion of the belt, wherein, in the second configuration, the tensioning mechanism is configured to apply tension to the portion of the belt, and wherein, in both the first configuration and the second configuration, the tensioning mechanism and the base define a tortuous, nonlinear belt pathway from the first side of the base to the second side of the base.

Illustration 22. The child seat of any preceding or subsequent illustrations or combination of illustrations, wherein the tensioning mechanism comprises a first arm and a second arm pivotably attached to the first arm, wherein, in the first configuration, first arm extends at a first angle relative to the second arm, and in the second configuration, the first arm extends at a second angle relative to the second arm that is different from the first angle.

Illustration 23. The child seat of any preceding or subsequent illustrations or combination of illustrations, wherein the tensioning mechanism comprises a bottom arm and a top arm, wherein the bottom arm is pivotably connected to the base within the receiving region, and wherein the top arm is pivotably connected to the bottom arm.

Illustration 24. The child seat of any preceding or subsequent illustrations or combination of illustrations, wherein the bottom arm comprises a first end and a second end opposite from the first end, wherein the top arm comprises a first end and a second end opposite from the first end, wherein the first end of the bottom arm is pivotably attached to the base, and wherein the second end of the bottom arm is pivotably attached to the top arm between the first end and the second end of the top arm.

Illustration 25. The child seat of any preceding or subsequent illustrations or combination of illustrations, wherein the top arm further comprises a top side and a bottom side, and wherein the second end of the bottom arm is pivotably attached to the bottom side of the top arm between the first end and the second end of the top arm.

Illustration 26. The child seat of any preceding or subsequent illustrations or combination of illustrations, wherein the top arm further comprises a front end, a back end opposite the front end, a top side, and a bottom side opposite the top side, and wherein the belt pathway is defined between the bottom side of the top arm and the base and between the bottom arm and the front end of the top arm.

The above-described aspects are merely possible examples of implementations, merely set forth for a clear understanding of the principles of the present disclosure. Many variations and modifications may be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described embodiments, nor the claims that follow.

That which is claimed:

1. A child seat configured to be secured to a car seat, the child seat comprising:
   a base comprising a receiving region, wherein the base is configured to receive a belt of the car seat at least within the receiving region and to secure the child seat to the car seat; and
   a tensioning mechanism attached to the base within the receiving region and pivotable about a first pivot axis, wherein the tensioning mechanism comprises a second pivot axis offset from and parallel to the first pivot axis, wherein the second pivot axis is movable relative to the base, wherein the tensioning mechanism is adjustable between a first configuration and a second configuration, wherein, in the first configuration, the tensioning mechanism is configured to receive a portion of the belt, and wherein, in the second configuration, the tensioning mechanism is configured to apply tension to the portion of the belt;
   wherein the tensioning mechanism comprises a bottom arm and a top arm, wherein the bottom arm is pivotably attached to the base and pivotable about the first pivot axis, and wherein the top arm is pivotably attached to the bottom arm and defines the second pivot axis;
   wherein the bottom arm is a first bottom arm and the top arm is a first top arm, and wherein the tensioning mechanism further comprises:
      a second bottom arm pivotably attached to the base within the receiving region; and
      a second top arm pivotably attached to the second bottom arm and pivotably attached to the first top arm.

2. The child seat of claim 1, wherein a greatest distance between the tensioning mechanism and the base in the first configuration is greater than a distance between the tensioning mechanism and the base in the second configuration.

3. The child seat of claim 1, wherein the tensioning mechanism comprises:
   a bottom arm attached to the base within the receiving region, the bottom arm pivotable relative to the base about the first pivot axis;
   a top arm attached to the bottom arm, the attachment of the top arm and the bottom arm defining the second pivot axis, and wherein the top arm is pivotable relative to the bottom arm about the second pivot axis; and
   a handle supported by the top arm, wherein the handle comprises a locking pin configured to engage the base in the second configuration.

4. The child seat of claim 1, wherein the tensioning mechanism comprises a bottom arm and a top arm, wherein the bottom arm is pivotably attached to the base within the receiving region, and wherein the top arm is pivotably attached to the bottom arm, wherein, in the first configuration, the top arm extends at a first angle relative to the bottom arm, and wherein, in the second configuration, the top arm extends at a second angle relative to the bottom arm that is different from the first angle.

5. The child seat of claim 4, wherein the bottom arm comprises a first end and a second end opposite from the first end, wherein the top arm comprises a first end and a second end opposite from the first end, wherein the first end of the bottom arm is pivotably attached to the base, and wherein the second end of the bottom arm is pivotably attached to the top arm between the first end and the second end of the top arm.

6. The child seat of claim 4, wherein the top arm further comprises a top side and a bottom side, and wherein the second end of the bottom arm is pivotably attached to the bottom side of the top arm between the first end and the second end of the top arm.

\* \* \* \* \*